UNITED STATES PATENT OFFICE.

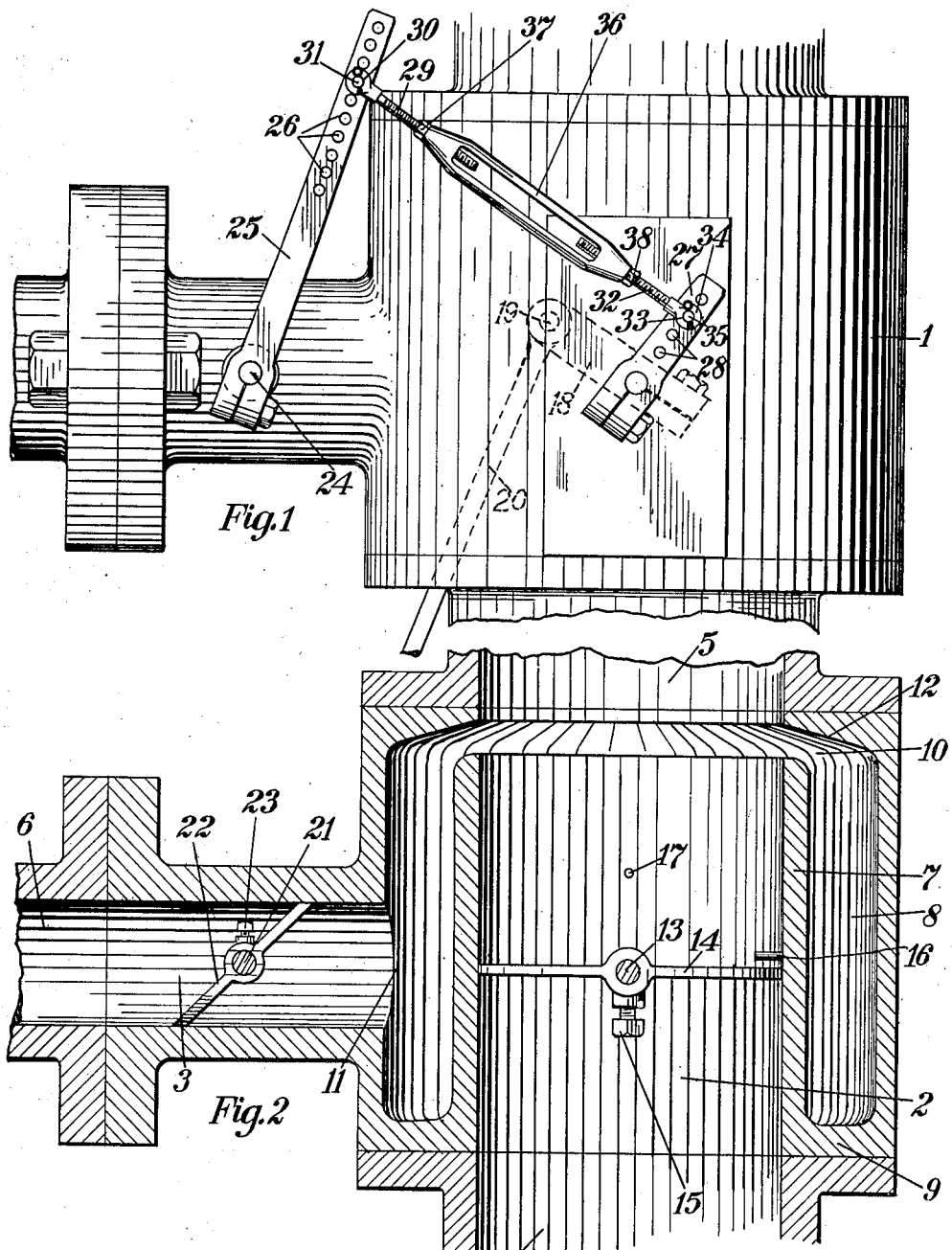
L. A. FRAYER.
VALVE CONTROL.
APPLICATION FILED JULY 27, 1907.
913,121.
Patented Feb. 23, 1909.
Lee A. Frayer, INVENTOR.

LEE A. FRAYER, OF COLUMBUS, OHIO, ASSIGNOR TO THE COLUMBUS MACHINE COMPANY, OF COLUMBUS, OHIO, A CORPORATION.

VALVE CONTROL.

No. 913,121.  Specification of Letters Patent.  Patented Feb. 23, 1909.

Application filed July 27, 1907. Serial No. 385,877.

*To all whom it may concern:*

Be it known that I, LEE A. FRAYER, a citizen of the United States, residing at Columbus, in the county of Franklin and State of Ohio, have invented certain new and useful Improvements in Valve Control, of which the following is a specification.

My invention relates to improvements in valve control for gas engines especially, and consists, in general, of devices for connecting the gas intake valve with the air intake valve so that the two valves may be set at the proper degree of opening in order to obtain the desired richness of fuel resulting from the mixture. One of the valves is under the control of the governor, and as the connections between the valves, when once adjusted, remain fixed until a readjustment, the actuation of one valve through the governor operates to change the position of the other valve, so that after being adjusted and the engine started, both valves are under the control of the governor. Further, the connections between said valves are so constructed that they may be easily and quickly adjusted to produce a very fine variation in the inflow of either gas or air, as desired.

The specific construction employed to produce the above mentioned effects will be described hereinafter, and the invention pointed out in the claim.

Referring to the drawings hereto attached and forming a part of this specification, Figure 1 is a side view of the valve casing showing the adjustable connections between the valves; Fig. 2 is a vertical longitudinal section through the valve chambers and the valves showing the mounting of the valves and the general construction thereof and of the valve chambers.

In the drawings in which like numerals indicate like parts throughout, 1 is a casing inclosing the valve chambers 2 and 3, which are preferably arranged at a right angle with each other, the pipes 4 and 5 leading respectively into and out of the chamber 2 and the pipe 6 leading into the chamber 3. The details of a gas engine are not herein shown, as the casing containing the valves and the adjustable connections between the same may be mounted in any manner to accomplish the results, and no specific method of connecting said casing with the engine is herein claimed and therefore none need be described. Arranged in the valve chamber 2 is the annular wall 7, between which and the casing is an annular chamber 8, closed at its lower side, as shown at 9, but open around its upper side, as shown at 10, and communicating at its upper side with the chamber 2; the annular chamber is in direct communication with the valve chamber 3, as seen at 11, so that a fluid entering through valve chamber 3 will be circulated through the annular chamber 8 and will pass upwardly therefrom and will contact with the inner face of the flange portion 12 of the upper side of the casing, and will thereby be deflected inwardly to mingle with the fluid which has passed through the valve chamber 2.

Mounted in the casing and passing through the walls thereof is the rod 13, adapted to rotate freely, and carrying thereon the butterfly valve 14, the latter being fixed in its position upon the rod by the set screw 15. The valve being thus fixed upon the rod, when the rod is turned, the valve will rotate freely, and inasmuch as the valve is wide open when in a vertical position, and is closed when in horizontal position, I provide the stop 16 passing through the annular wall at one side of the chamber 2 which contacts against the upper face of the valve when the latter is in horizontal position, and prevents a further swing of the valve in that direction; I also provide the stop 17 in the annular wall which contacts with the valve when the latter is in its vertical position, and prevents further movement in that direction. Therefore, by means of the stops mentioned, I render the opening and the closing of the valve positive. At one end of the rod 13 is mounted the short lever 18, to which is secured the lower end 19 of a rod 20, communicating with the governor, which latter is not herein shown; it is clear, however, from the connection mentioned, that the operation of the governor will control the swing of the butterfly valve 14.

Mounted in the right angular portion of the casing is a rod 21, adapted to rotate freely therein and passing through the valve chamber 3, and having fixed thereon valve 22, by means of the set screw 23; this valve is made to fit into the valve chamber in an inclined manner, so that the same may be given a vertical swing therein and may also be set to secure variations in the quantity of fluid admitted therethrough. Valve 22 is adapted to swing vertically, because of its elliptical shape, and is stopped in its swing by contact with the walls of the valve chamber 3, thereby obviating the necessity of pins or stops as used in the valve chamber 2.

Referring to Fig. 1, it is noted that at the end 24 of the rod 21 is mounted a lever 25, having a plurality of perforations 26 distributed longitudinally thereof; also at the corresponding end of the rod 13 is mounted the lever 27 having perforations 28 distributed longitudinally thereof. Each valve is adapted to be actuated by the operation of its attached lever. The threaded rod 29 having the opening 30 at one end thereof, is adapted to be removably secured on the pin 31 which may be inserted through any of the perforations 26 preferred. Similarly, the oppositely threaded rod 32 having the opening 33 through its end 34, is adapted to receive the pin 35, the latter being inserted through any of the perforations 28 desired. The turn buckle 36 is adapted to receive the threaded ends of the rods 29 and 32, and when positioned upon these rods, the position of the turn buckle is controlled by the nuts 37 and 38. When the parts are connected in the manner described, it is seen that if the rod 20 leading from the governor be actuated by the latter, motion will be imparted to the valve 14 through the rod 13 and thence through the connections described to the rod 21 and to the valve 22; consequently, if the engine is running too rapidly, the operation would result in a slight closure of the valve, and if it were running too slowly it would result in a slight opening of the valve, always supposing that the valves had been properly adjusted through the perforated lever and turn-buckle connections before the engine is started.

Assume that the threaded rods with the turn buckle thereon have been connected with the levers 25 and 27 and have been located at such perforations as will permit the closure of both the valves. Now if the turn buckle be manipulated to increase the distance between said levers, valve 14 will be rotated and partially opened, valve 22 remaining closed. If, however, the turn buckle be manipulated so as to decrease the distance between the levers, valve 22 will be opened, valve 14 remaining closed. It is therefore seen that without changing the position of the ends of the threaded rods by moving the same to other perforations, the valves may be manipulated merely by turning the turn buckle. If, for instance, the threaded rod engages the lever 27 at the topmost perforations therethrough while the lever 25 is engaged at the lowermost perforations therethrough, the turn buckle may be manipulated, so as to close both valves, by merely decreasing the distance between the levers. Now, if the turn buckle be manipulated to further decrease the distance between the levers, valve 22 will be opened, but if the turn buckle be manipulated so as to lengthen the distance between the levers, valve 14 will be opened. Leaving the turn buckle as it is when both valves are closed, if the end of the threaded rod be brought successfully to higher perforations in the lever 25, the valve 22 will be opened at the will of the operator; if, while the threaded rod is positioned at one of the higher perforations, as just mentioned, the turn buckle be manipulated to lengthen the distance between the levers, of course the effect will be to close the valve 22. If the connection with the lever 27 be through the lowest perforation thereof, and with lever 25 be through the uppermost perforation, and the turn buckle be manipulated so that both valves are closed for this position of the parts, if the engagement with the lever 25 be now shifted to lower perforations, the effect will be to open valve 14; if while the engagement with the lever 25 is through one of the lower perforations a valve 22 is partially opened, the turn buckle be manipulated to increase the distance between the levers, valve 22 will be moved towards its closed position, and if the manipulation be carried to an extent sufficient to completely close valve 22, then a further manipulation in the same direction will have the effect of opening valve 14. If, instead of manipulating the turn buckle as just stated, the engagement with lever 27 be changed to higher perforations, valve 14 will likewise be lifted.

From the foregoing it is apparent that the valves may be set at the will of the operator; when they are adjusted as desired and the engine is started, the action of the governor will ordinarily take care of the adjustment of the valves; if, however, it does not do so satisfactorily, then the operator may manipulate the turn buckle to produce the desired effect without disturbing the engagement of the threaded rods with the levers. Ready change of engagement with the levers is, however, effected if the operator desires, and the combined effect of the shifting of the position of the rods up or down the levers and the manipulation of the turn buckle, is to produce very fine variations in the quantity of fluid admitted.

Ordinarily I contemplate the admission of air by means of valve 14 and gas by means of valve 21; if, however, the gas is of very poor quality, as is usually true in the case of producer gas, I may admit it by means of valve 14 and admit air by means of the valve 22, and the parts may be so manipulated that, if deemed requisite, the supply of air in such case might be almost entirely cut off.

The foregoing description makes it clear that almost any degree of manipulation of the valves may be effected by means of my device for valve control, and changes in the adjustment may be quickly and easily made, so that the feeding of fuel will very quickly respond to the conditions indicated by the governor. It is also apparent that the positioning of the valves is positive and that adjustments are made positively, and by a construction which produces accurately the results desired.

Having described my invention, what I claim is:

A valve control for gas engines comprising a valve rotatably mounted, a stop therefor when in its closed position, and a second stop therefor when in its maximum open position, a second valve elliptical in outline rotatably mounted and adapted to engage the walls of the valve chamber at an acute angle when in its closed position, perforated levers mounted to turn with said valves, and an adjustable link connecting said levers, one of said valves being operatively connected to the governor of the engine.

In testimony whereof I affix my signature in the presence of two witnesses.

LEE A. FRAYER.

Witnesses:
   Geo. W. Rightmire,
   A. Rager.